United States Patent [19]

Koch, Jr. et al.

[11] 4,274,257
[45] Jun. 23, 1981

[54] ANTI-STALL CONTROLLER

[75] Inventors: William E. Koch, Jr., Marshall; Michael A. Klimowicz, Kalamazoo, both of Mich.

[73] Assignee: Eaton Corporation, Cleveland, Ohio

[21] Appl. No.: 1,809

[22] Filed: Jan. 8, 1979

[51] Int. Cl.³ .......................... F04B 1/26; F16D 31/02
[52] U.S. Cl. ........................................ 60/431; 60/443; 60/444; 60/449; 417/222
[58] Field of Search ................... 60/395, 431, 443, 444, 60/449, 445; 417/15, 218, 222; 91/437; 251/30; 137/613

[56] References Cited

U.S. PATENT DOCUMENTS

| | | | |
|---|---|---|---|
| 2,587,356 | 2/1952 | McPherson | 137/613 |
| 2,891,577 | 6/1959 | Stewart, Jr. | 137/613 X |
| 2,970,443 | 2/1961 | Springham | 91/437 |
| 2,976,685 | 3/1961 | Thoma et al. | 60/431 |
| 3,173,243 | 3/1965 | Reinke | 60/431 |
| 3,247,669 | 4/1966 | Hann | |
| 3,463,087 | 8/1969 | Grant | 91/437 X |
| 3,540,462 | 11/1970 | Renzi | 251/30 |
| 3,572,213 | 3/1971 | Lauck | 91/444 |
| 3,606,755 | 9/1971 | Connett | |
| 3,608,431 | 9/1971 | Pease | 91/437 |
| 3,783,611 | 1/1974 | Bojas | 60/445 X |
| 3,795,109 | 3/1974 | Bojas et al. | 60/445 X |
| 3,886,741 | 3/1974 | Ward | 60/431 |
| 4,050,247 | 9/1977 | Connett | 60/444 |
| 4,116,002 | 9/1978 | Knapp et al. | 60/445 |
| 4,180,979 | 1/1980 | Cornell | 60/449 |
| 4,187,681 | 2/1980 | Johnson | 60/395 |

Primary Examiner—Irwin C. Cohen
Attorney, Agent, or Firm—R. J. McCloskey; J. Yakimow; L. Kasper

[57] ABSTRACT

A control system is disclosed for a hydrostatic transmission of the type including a prime mover driven variable displacement pump, the displacement of which is controlled by a pair of strokers (28, 30). Flow of pressurized control fluid from the charge pump to one of the strokers, and from the other stroker to tank, is controlled by a main control valve (34). The control system includes an auxiliary control valve (44) defining passages (98, 100, 102) communicating between the lines connecting the main control valve and the strokers. The auxiliary control valve includes an on-off, electro-hydraulic valve (46) which prevents flow through the auxiliary valve in response to an electrical signal in one condition, and permits flow in response to an electrical signal in another condition. The electrical signals to the electro-hydraulic valve are generated by control logic (52) which alternates the electric signal between the one condition and the other condition at a duty cycle which varies proportional to the amount of pump destroke needed to prevent stalling of the prime mover.

9 Claims, 7 Drawing Figures

ANTI-STALL CONTROLLER

BACKGROUND OF THE DISCLOSURE

The present invention relates generally to hydrostatic transmission control systems, and more particularly, to such a control system which can function as an antistall control, to vary the input to output speed ratio of a hydrostatic transmission and prevent overloading of the primer mover.

Hydrostatic transmission control systems, including anti-stall controls, are now well known in the art. Such controls have conventionally been either hydraulic or a combination of hydraulic and mechanical. The known, basic anti-stall control was merely an arrangement which reduced the pressure of control fluid communicated from the charge pump to the main system control means. The reduction in charge pressure in such a control is proportional to the drop in engine speed, below the reference speed.

Although such basic anti-stall controls were fairly simple, various operational shortcomings of such systems resulted in further development and system sophistication. For example, in U.S. Pat. No. 3,886,741, assigned to the assignee of the present invention, the anti-stall control includes a rate control valve which limits the rate at which the swashplate would come back to commanded stroke, after the impending stall condition was alleviated, to prevent the condition known as "cycling".

As a result of this and other similar developments in hydraulic anti-stall controls, it was possible for those skilled in the art to produce an anti-stall control which could be made to operate satisfactorily on a given vehicle, and under a given set of conditions. However, because of the complexity of such systems, extensive setup and adjustment of the system was required after installation on the vehicle, and even then, repeatability in performance of the system could not always be achieved.

Accordingly, it is an object of the present invention to provide an anti-stall control which is relatively simple and inexpensive compared to known anti-stall controls, but which has a substantially improved repeatability of performance, with minimum setup and adjustment required.

Another drawback of the known anti-stall controls was that, partially because of their complexity, such controls are not readily adaptable to perform other control functions, except by means of additional linkage and components which would have merely compounded the above-described problems of difficulty of setup and lack of repeatability.

Accordingly, it is another object of the present invention to provide an anti-stall control which is capable of performing other control functions, either simultaneously with its anti-stall function, or as an alternative thereto.

It is a related object of the present invention to provide a control system which achieves such versatility merely by means of minor modification to the electronic logic portion of the control system.

The above and other objects are accomplished by the provision of an improved control system for a hydrostatic transmission of the type including a prime mover driven variable displacement pump; fluid operable means for varying the displacement of the pump, the fluid operable means defining first and second fluid pressure chambers; a source of pressurized control fluid; main control means operable to control the flow of pressurized control fluid from the source to the fluid operable means; the source of control fluid, the main control means and the first fluid pressure chamber defining a first control fluid path; and the second fluid pressure chamber, the main control means and a fluid reservoir defining a second control fluid path. The improved control system includes an auxiliary control valve means operable to communicate control fluid from the first control fluid path to the second control fluid path. The auxiliary control valve means includes an on-off, electro-hydraulic valve disposed in the control conduit means to prevent fluid communication therethrough in response to an electrical input signal in one condition, and to permit fluid communication therethrough in response to an electrical input signal in another condition. A control logic means is operable in response to variations in an input condition to alternate the electrical input signal between the one condition and the other condition at a duty cycle determined by the deviation of the input condition from a normal operating condition.

DESCRIPTION OF THE PREFERRED EMBODIMENTS

Figure 1:
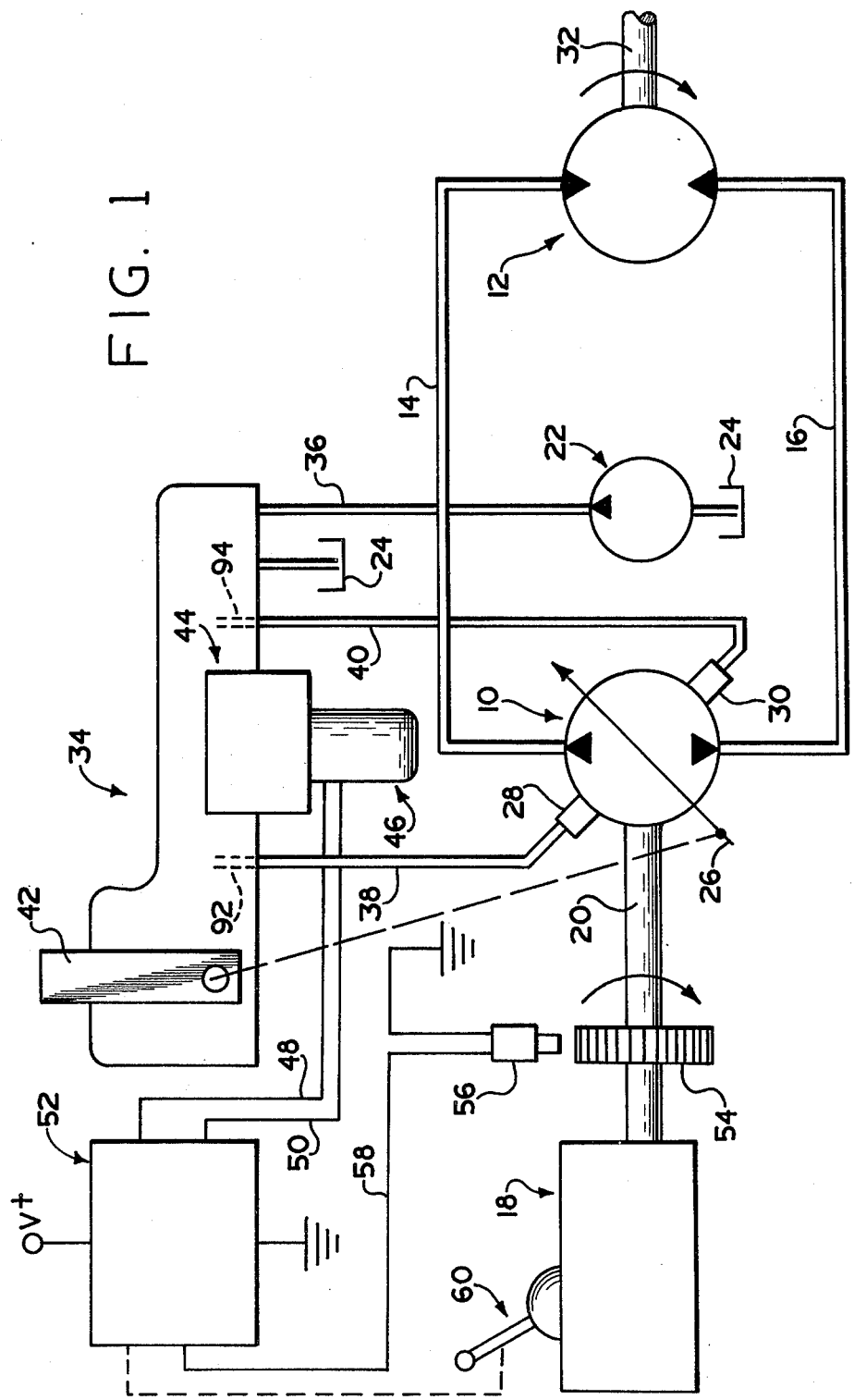
FIG. 1 is a schematic illustration of a hydrostatic transmission control system including the improved anti-stall control of the present invention.

Referring now to the drawings, which are not intended to limit the invention, FIG. 1 illustrates a hydrostatic transmission and its associated control system. The hydrostatic transmission includes a variable displacement swashplate fluid pump 10, preferably of the axial piston type, hydraulically connected to a fluid motor 12 by means of conduits 14 and 16. Typically, the motor 12 is a fixed displacement, axial piston unit, although the motor 12 may be variable displacement, and the control system of the invention may then be applied to the displacement controls of the motor 12.

Input power to the hydrostatic transmission is supplied by an engine 18, by means of an input shaft 20, which drives the rotating group of the pump 10, and also drives a charge pump 22. One function of the charge pump 22 is to supply make-up fluid to the low pressure side of the system by means well known in the art and therefore, not shown in FIG. 1. The charge pump 22 receives its inlet fluid from a fluid reservoir 24.

The pump 10 includes a swashplate 26 which is movable over-center, in a known manner, by a pair of stroking cylinders 28 and 30. The motor 12 includes an output shaft 32. Various other standard controls, such as relief and shuttle valves, which are well known, and form no part of the present invention, have been omitted from FIG. 1 and the description.

In the embodiment of the control system illustrated in FIG. 1, the displacement of the pump 10, and thus the speed ratio between the input shaft 20 and output shaft 32, is varied by a main control, generally designated 34. The main control 34 is capable of changing the position of the swashplate 26 by communicating control fluid, received from the charge pump 22 by means of a conduit 36, to one of the strokers 28 or 30, the control 34 communicating the other of the strokers to the reservoir 24. The control pressure fluid is communicated from the control 34 to the strokers 28 and 30 by means of conduits 38 and 40, respectively. The selective porting of fluid by the control 34 to the strokers 28 and 30 is in response to movement of a manual control lever 42.

The main control 34 may be of the type illustrated in U.S. Pat. No. 4,050,247, assigned to the assignee of the present invention, and which is incorporated herein by reference. However, the reference to 4,050,247 is by way of example only, and is not intended to limit the invention. Within the scope of the present invention, it is essential only that the control 34 be operable to control the flow of control fluid from the conduit 36 to one of the conduits 38 or 40, while communicating control fluid from the other of the conduits 38 or 40 to the reservoir 24. One embodiment of the main control 34 will be described in greater detail in connection with FIGS. 2 and 3.

Referring still to FIG. 1, there is associated with the main control 34 an auxiliary control valve, schematically indicated at 44, which also will be described in greater detail in the subsequent Figures. The auxiliary control valve 44 includes an electro-hydraulic valve, schematically indicated at 46, which is actuated by an electrical signal transmitted by a pair of leads 48 and 50. The leads 48 and 50 transmit the output signals from a control logic circuit, generally designated 52, which will be described in greater detail in connection with FIG. 5.

In a preferred embodiment of the present invention, the control logic 52 permits the auxiliary control valve 44 to serve as an anti-stall control. As in most anti-stall systems, the actual engine speed is continuously compared to some reference speed, for the purposes of sensing an imminent engine stall condition, which is indicated by a sudden reduction in engine speed, relative to the reference speed. Therefore, in FIG. 1, one of the inputs to the control logic 52 is the actual, instantaneous engine speed. A toothed member 54 is mounted for rotation with the input shaft 20, and disposed adjacent the toothed member 54 is a magnetic pickup 56. As is well known in the art, the magnetic pickup 56 generates lines of magnetic flux which are "cut" by the teeth of the member 54 as it rotates, such that the pick-up 56 generates an AC signal, the frequency of which is directly proportional to the speed of rotation of the member 54. The generated AC signal is transmitted from the pick-up 56 to the control logic 52 by means of an electrical lead 58. The other input to the control logic 52 is the reference speed which, in FIG. 1, is illustrated schematically as being the desired speed of the engine 18, as selected by a throttle setting, designated 60. It will be understood by those skilled in the art that, in a typical vehicle application for such a system, there is no manually operable throttle setting, but instead, the engine 18 is supposed to operate at a constant, predetermined speed. In such cases, the reference speed input to the control logic 52 comprises an electrical setting, such as an adjustable potentiometer.

Figure 2:
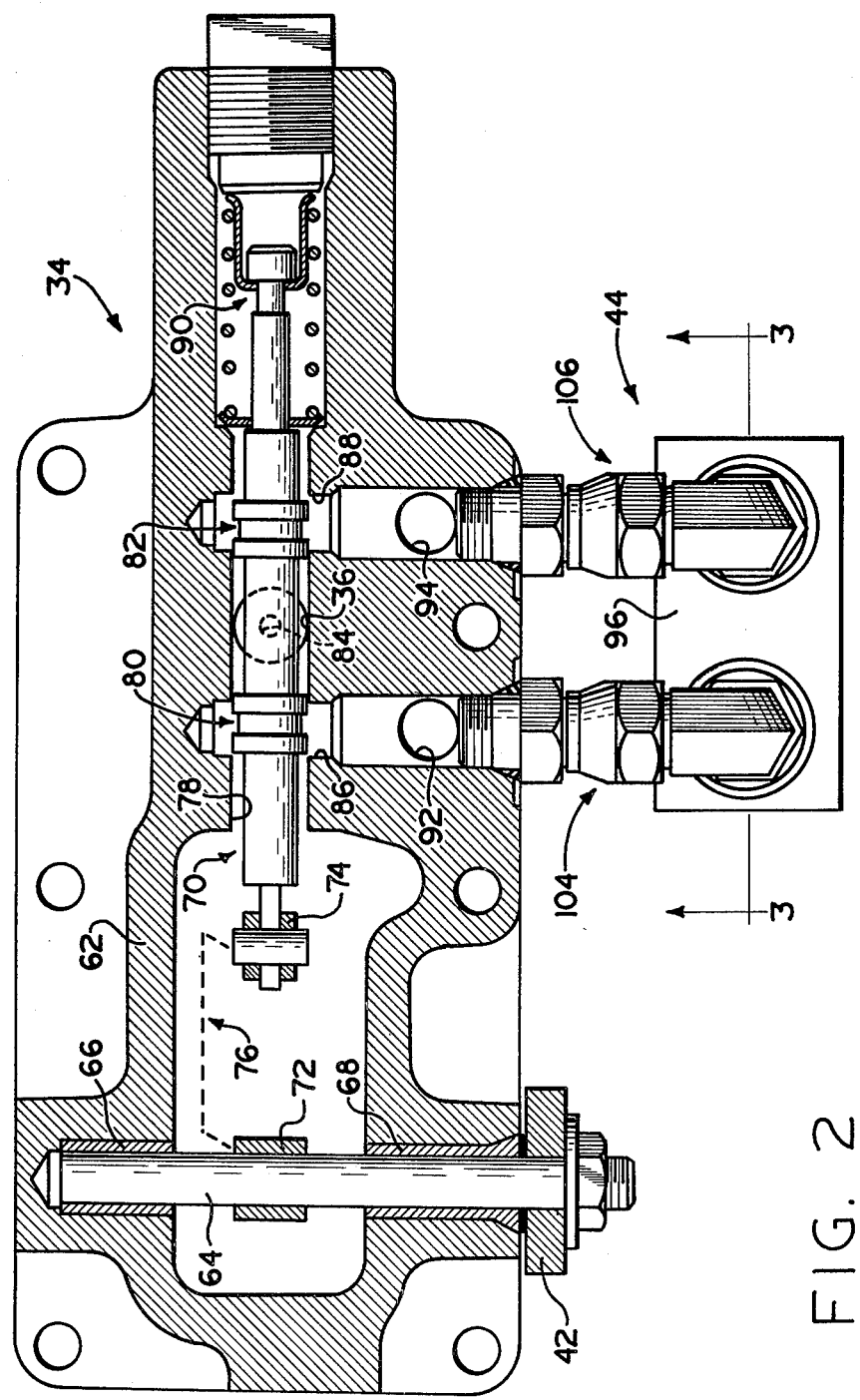
FIG. 2 is a transverse cross section of the main control valve shown schematically in FIG. 1.

Referring now to FIG. 2, the main control 34 is shown in greater detail. The main control 34 includes a valve housing 62 within which is rotatably disposed a control shaft 64, mounted in a pair of axially spaced bushings 66 and 68, with the control shaft 64 projecting out of one side of the housing 62. The manual control lever 42 is rigidly secured to the control shaft 64 by suitable means, shown in FIG. 2 as including a washer and nut. The control shaft 64 is connected to a control spool, generally designated 70, by a linkage including members 72 and 74, and a linkage portion indicated schematically at 76.

The housing 62 defines a valve bore 78, and the control spool 70 includes a pair of axially spaced lands 80 and 82 disposed in sliding, sealing engagement with the valve bore 78. The conduit 36 intersects the valve bore 78, to communicate control fluid from the charge pump 22 into the bore 78, between the lands 80 and 82, through an inlet orifice 84. The housing 62 includes a pair of axially spaced drilled passages 86 and 88 which intersect the valve bore 78 and are spaced slightly outwardly from the lands 80 and 82, such that the passages 86 and 88 are in fluid communication with the reservoir 24 when the control spool 70 is in the neutral position illustrated in FIG. 2. A centering spring assembly 90 is provided to center the spool 70 relative to the passages 86 and 88.

It should be noted in FIG. 2 that the passages 86 and 88 extend from the valve bore 78 to the exterior of the housing 62, terminating in a pair of threaded ports which are normally referred to as "servo access ports". Intersecting the passages 86 and 88 are fluid passages 92 and 94, respectively, which communicate with the conduits 38 and 40, respectively, to communicate the control fluid to the strokers 28 and 30, respectively. In commercially available controllers such as the main control 34, it has been standard practice to merely plug the servo access ports during normal use of the hydrostatic transmission, with the servo access ports being used only for trouble shooting, e.g., to attach a gage and check the pressure of control fluid communicated to the strokers under various operating conditions.

Figure 3:
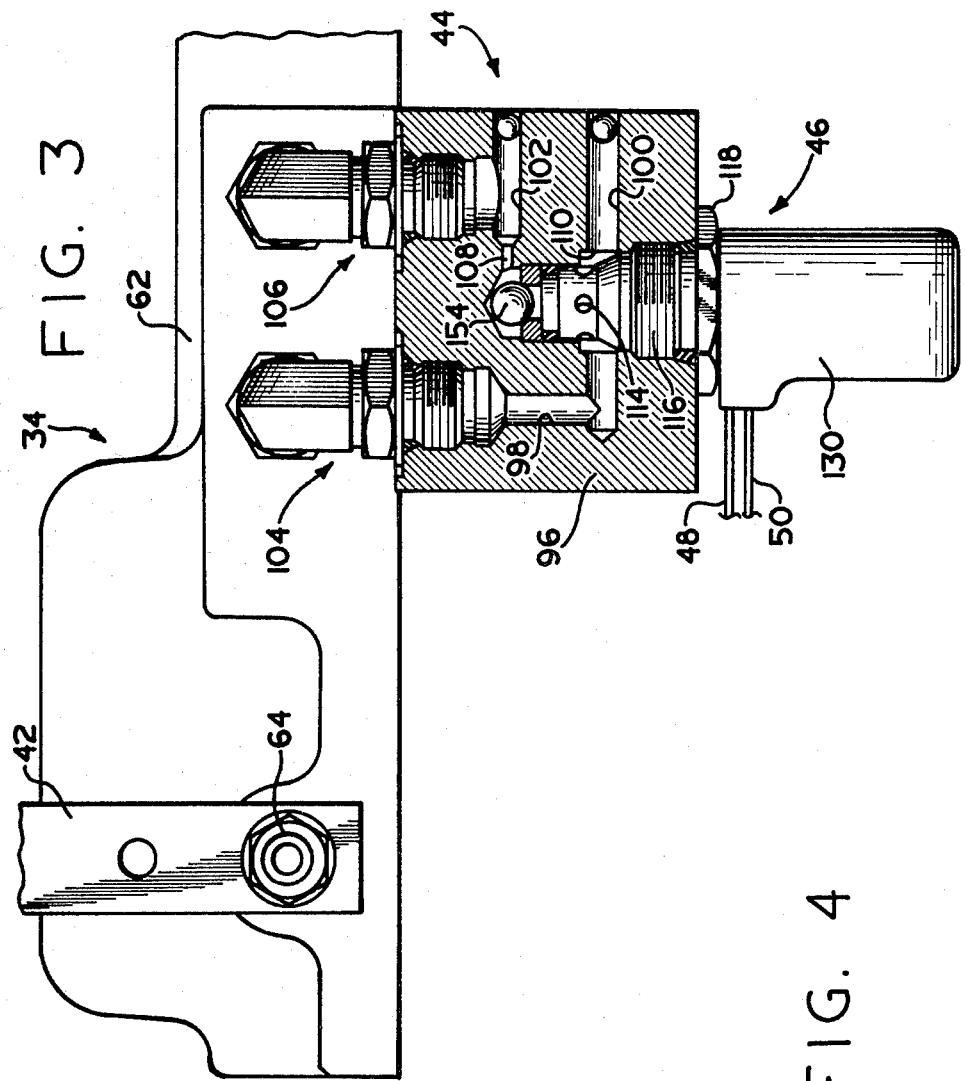
FIG. 3 is a cross section taken on line 3—3 of FIG. 2, including a plan view of the main control valve.
Figure 4:
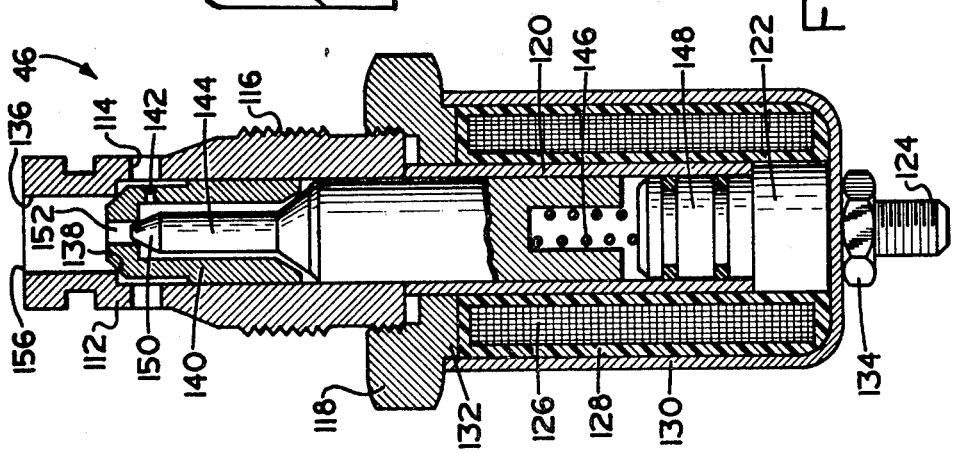
FIG. 4 is a longitudinal cross section through the electro-hydraulic valve shown in plan view in FIG. 3.

Referring now to FIG. 3, in conjunction with FIG. 2, the construction and operation of the auxiliary control valve 44 will be described. The auxiliary control valve 44 includes a valve body 96 defining a pair of fluid passages 98 and 100, as well as a fluid passage 102. When utilizing the auxiliary control valve 44 of the present invention, the threaded plugs which have in the base been used to plug the servo access ports are removed, and a fitting assembly 102 is inserted to provide fluid communication between the passage 86 and the passage 98, while a fitting assembly 106 is inserted to provide fluid communication between the passage 88 and the passage 102. The passage 102 communicates through a reduced diameter orifice 108 with a multi-stepped bore 110 which is disposed in fluid communication with the fluid passage 100. Disposed within the stepped bore 110 is the upper portion of the electro-hydraulic valve 46, which is shown in cross section in FIG. 4, but on a larger scale and on a different plane. It should become apparent to those skilled in the art that the specific construction and operation of the electro-hydraulic valve 46 is not an essential feature of the present invention, and that various designs of electro-hydraulic valves which are presently commercially available may be utilized with the present invention. FIG. 4 is included herein to illustrate what is now considered the best mode of the present invention.

Referring to FIG. 4, the electro-hydraulic valve 46 includes an annular housing 112 which defines a plurality of fluid ports 114 and a set of external threads 116, by means of which the valve 46 is in threaded engagement with the valve body 96. The fluid ports 114 are in fluid communication with the fluid passage 110, by means of the enlarged portion of the stepped bore 110.

Adjacent its lower end, the annular housing 112 is in threaded engagement with a large hex nut 118 to which is welded an elongated tubular member 120. At the bottom end of the tubular member 120 is welded a cylindrical member 122, from which a threaded member 124 projects downwardly. Surrounding the tubular member 120 is an electro-magnetic coil 126, encapsulated in a plastic covering 128. Surrounding the coil 126 and covering 128 is a coil casing 130, the upper end of which seats against a shoulder 132, formed on the underside of the hex nut 118. The coil casing 130 is maintained in fixed engagement with the hex nut 118 and shoulder 132 by means of a nut 134, in engagement with the threaded member 124. In the subject embodiment, the coil casing 130 is preferably made from a ferro-magnetic material and comprises a portion of the electro-magnetic flux path, for reasons which will become apparent.

The annular housing 112 defines an axially extending, stepped bore 136, which defines a poppet seat 138. Disposed in sliding engagement within the larger portion of the bore 136 is a poppet member 140 which defines at least one pilot port 142. Pressurized fluid from passage 100 flows through the inlet ports 114 to fill the annular chamber between the housing 112 and the poppet member 140, thus exerting a downward biasing force on the poppet member 140. At the same time, fluid flows through the pilot port 142, filling the inside of the poppet member 140 to exert an upward biasing force. The areas on the poppet member 140 are selected such that the pressurized fluid in the passage 100 exerts a net biasing force upward, normally maintaining the poppet member 140 in sealing engagement with the poppet seat 138.

Disposed partially within the poppet member 140, and partially within the tubular member 120 is a pilot stem 144 which is normally biased upwardly to the position shown in FIG. 4 by a compression spring 146, seated against a seal ring member 148 which, in turn, is seated on the cylindrical member 122. The pilot stem 144 terminates, at its upper end, in a frusto-conical pilot valve portion 150 which is normally seated in sealing engagement with a seat defined by the lower edge of an axial passage 152, defined by the poppet member 140. Referring again to FIG. 3, it may be seen that a check ball 154 may be in sealing engagement with an annular seat 156 (see FIG. 4) defined by the bore 136 to prevent fluid flow from the stroker 30 to the stroker 28, when the stroker 30 is pressurized.

Although not an essential feature of the present invention, it is preferred that the electro-hydraulic valve 46 be in the closed position shown in FIG. 4 when the electro-magnetic coil 126 is not energized. In operation, when the coil 126 is energized, the surrounding lines of flux pass through the larger, lower portion of the pilot stem 144, exerting a downward biasing force in opposition to the biasing force of the spring 146, thus moving the pilot stem 144 slightly downwardly. The pilot valve portion 150 moves away from its associated seat, permitting just enough flow of fluid from the interior of the poppet member 140 through the passage 152, and into the bore 136, to reduce the fluid pressure within the poppet member 140 enough to that the net biasing force acting on the poppet member 140 is now downward. As a result, the poppet member 140 moves away from the seat 138 permitting a relatively larger flow of fluid through the ports 114, past the seat 138, through the upper portion of the bore 136, and past the check ball 154 into the orifice 108. By way of example only, in the subject embodiment, the flow through the valve 46 is approximately 5 gpm when the pressure drop from the passage 100 to the passage 102 is approximately 100 psi. Although the above description of operation discusses the flow through the valve 46, in terms of the poppet member 140 being "open", it should be understood that the period of time during which the valve 46 is truly "open" is very short, as will be described in greater detail in connection with FIG. 5.

Referring again primarily to FIGS. 1, 2, and 3, the function of the auxiliary control valve 44 and electrohydraulic valve 46 will be described further, as it relates to the entire hydrostatic transmission control system. Assume for purposes of description that the manual control lever 42 has been moved to such a position that the control spool 70 shifts to the left in FIG. 2, permitting communication of control fluid from the charge pump 22, through the fluid conduit 36 and inlet orifice 84 and into the valve bore 78. The control fluid in the valve bore 78 flows past the land 80 into the passage 86, then through the passage 92, and through the conduit 38 to the stroker 28, thereby stroking the variable displacement pump 10 to the desired displacement and output flow. The follow-up connection between the swashplate 26 and the control spool 70 (see dashed line in FIG. 1) causes the control spool 70 to return toward its neutral position, to a position in which the land 80 is effective to meter control fluid from the valve bore 78 to the fluid passage 86, to maintain the desired position of the swashplate 26, while the stroker 30, conduit 40, passage 94 and passage 98 are open to tank, past the land 82.

For purposes of further description, it will also be assumed that the auxiliary control valve 44 is serving as an anti-stall control, in which case the inputs to the control logic 52 are as described in FIG. 1, and energization of the coil 126 of the on-off electro-hydraulic control valve 46 depends upon the output signals from the control logic 52, as transmitted by the leads 48 and 50. If the coil 126 is energized, indicating an impending stall condition of the engine 18, the electro-hydraulic valve 46 is actuated, and permits flow therethrough as described in connection with FIG. 4. Thus, there is a flow of pressurized control fluid from the passage 86, through the passages 98 and 100, through the valve 46, through the orifice 108, then through the passage 102, the fitting 106 and into the passage 88. This flow results in a reduction of the fluid pressure acting on the stroker 28. The amount of the destroke of swashplate 26 necessary to maintain desired engine speed is determined by the control logic 52, but the resulting actuation of the valve 46 permits the removal from the fluid path leading to the stroker 28 of the appropriate amount of pressurized control fluid to permit the necessary destroke, and immediately transfers that quantity of control fluid to the fluid path leading to the stroker 30, thereby assisting the destroke, while preventing cavitation in the stroker 30 as a result of the destroke. In the embodiment of FIGS. 2 and 3, the auxiliary control valve 44 is unidirectional, i.e., it is able to communicate control fluid in only one direction, from the stroker 28 to the stroker 30. This embodiment would be used in applications where, for example, it is known that a stall condition is likely to occur during only one direction of vehicle operation. It should be noted that the control valve 44, including the fitting assemblies 104 and 106 could be reversed, in which case the control valve 44 would then be effective to communicate control fluid from the stroker 30 to the stroker 28, and prevent a stall condition in the opposite direction of vehicle operation.

Figure 5:
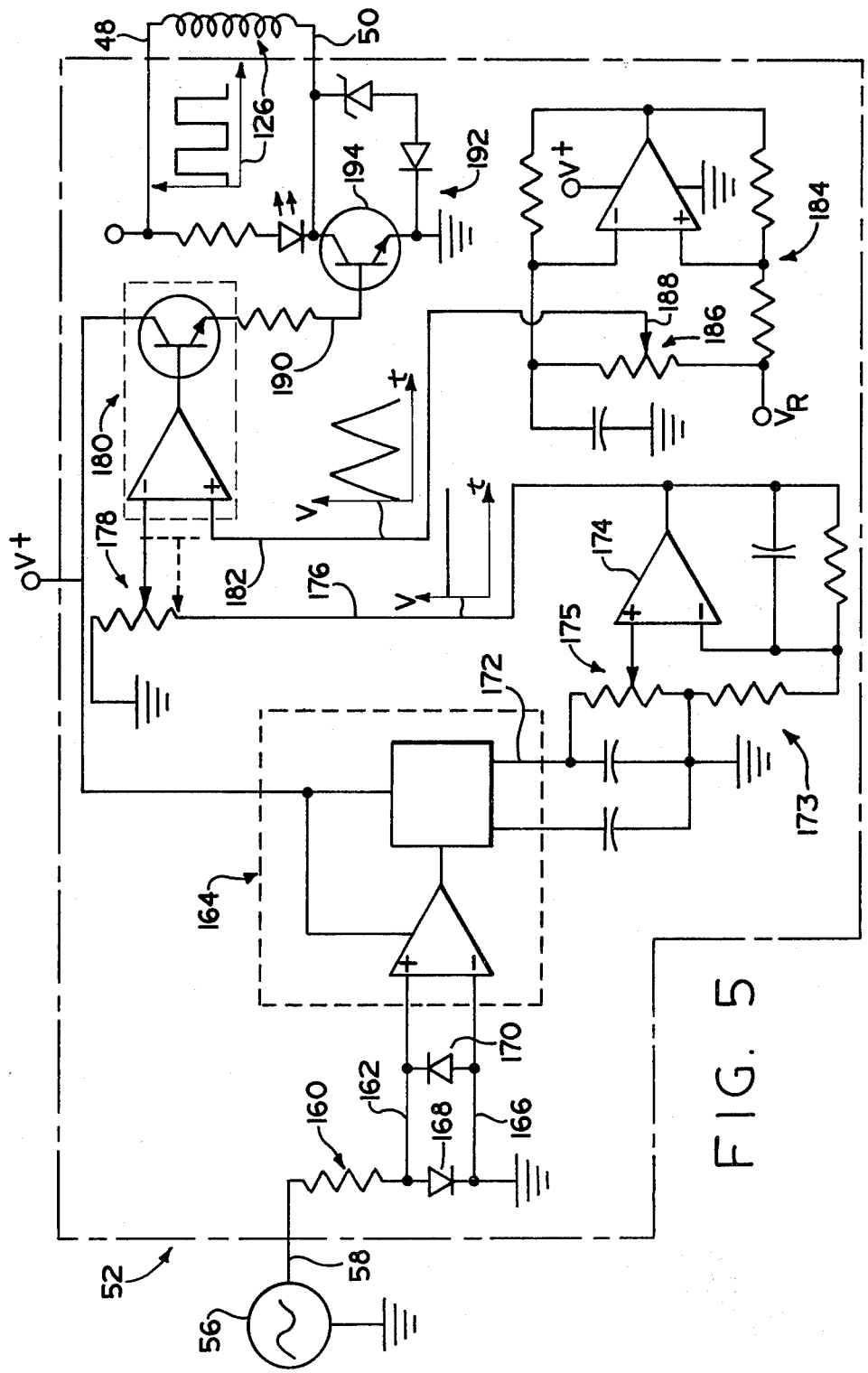
FIG. 5 is a circuit schematic of the control logic utilized to energize the electro-hydraulic valve shown in FIG. 4.
Figure 6:
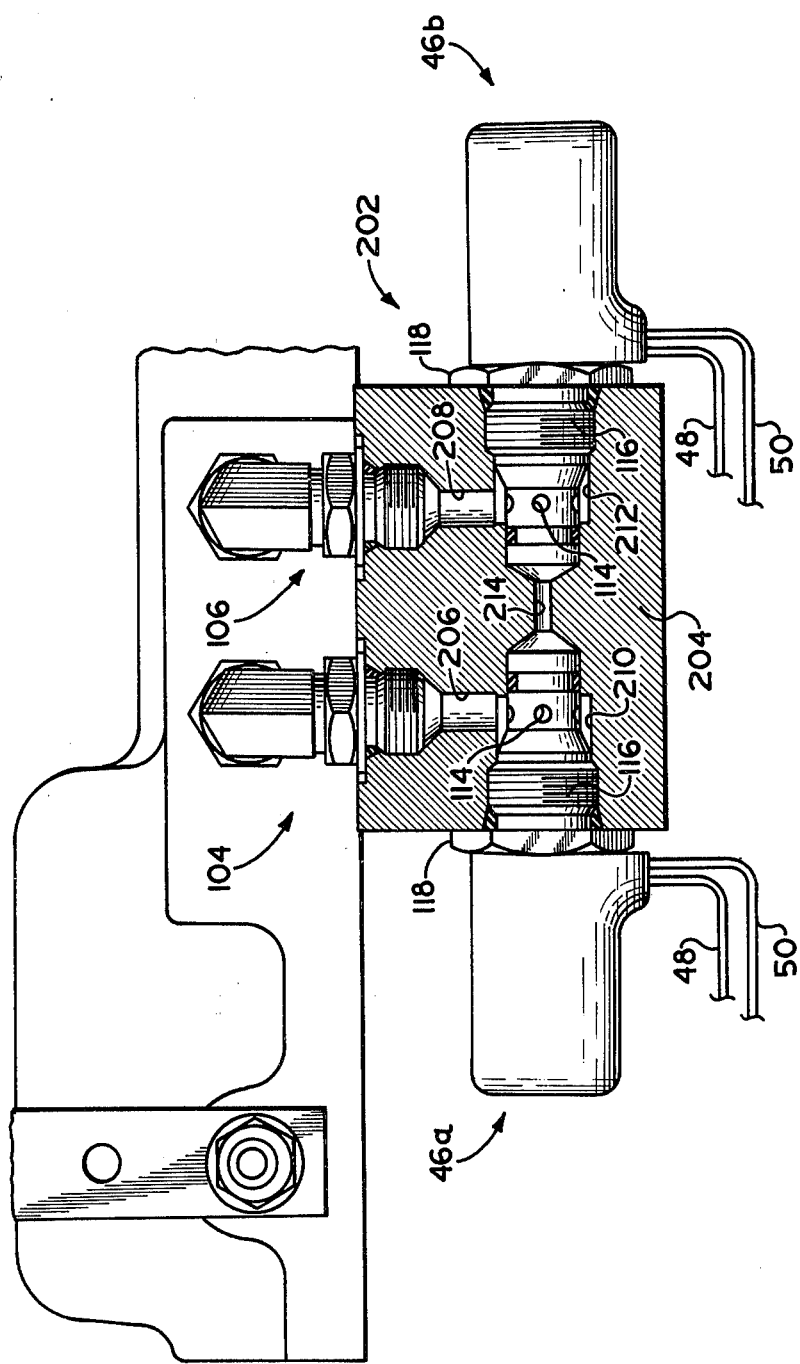
FIG. 6 is a view similar to FIG. 3, illustrating an alternative embodiment of the auxiliary control valve of the invention.

Reference will now be made to the circuit schematic in FIG. 5, illustrating a preferred embodiment of the control logic 52, suitable for permitting the auxiliary control valve 44 to operate as an anti-stall control. As described in connection with FIG. 1, the AC signal generated by the magnetic pick-up 56 is transmitted to the control logic 52 by means of the lead 58. The AC signal on the lead 58 is conducted through a resistor 160 to a lead 162 which is one of the inputs to a frequency-to-voltage converter circuit, generally designated 164, of the type which is well known and commercially available. The other input to the converter circuit 164 is a ground lead 166, and connected in parallel between the leads 162 and 166 is a pair of diodes 168 and 170, the characteristics of which are selected to limit the amplitude of the signal transmitted to the converter circuit 164. The function of the converter circuit 164 is to convert the variable frequency AC signal transmitted by the lead 162 into a DS signal having a voltage proportional to the frequency of the AC signal, and thus, proportional to the speed of the engine 18.

The DC output of the converter circuit 164 is transmitted by a lead 172 to a signal conditioning circuit, generally designated 173, which includes a non-inverting amplifier 174. As was described in connection with FIG. 1, the reference speed input to the control logic 52 may comprise, instead of the throttle setting 60, an electrical setting. In FIG. 5, the conditioning circuit 173 includes such a setting. The input to the plus terminal of the amplifier 174 is an adjustable potentiometer 175. As the wiper is moved upward in FIG. 5, the voltage input to the plus terminal of the amplifier 174 increases, as does the output of the conditioning circuit 173. The effect of such a change on the signal transmitted to the coil 126 will be discussed subsequently.

The output of the signal conditioning circuit 173 is transmitted by a lead 176 through a voltage divider circuit 178 (which will be referenced subsequently) to the inverting terminal of a comparator circuit 180. For purposes of the present description, it should be assumed that the circuit 178 is in its normal position, indicated by the dashed wiper, such that the signal on the lead 176 is transmitted, unmodified, to the inverting terminal. The input to the non-inverting terminal of the comparator 180 is by means of a lead 182, connected to the output of an oscillator circuit, generally designated 184. The oscillator circuit 184 includes a manual gain adjustement potentiometer 186, including an adjustable wiper 188 which is connected to the lead 182. The function of the oscillator circuit 184 is to provide, as one input to the comparator 180, a triangular-wave (or sawtooth) signal of a known frequency. For ease of description of the rest of FIG. 5, all subsequent references to the various signals will be by means of the reference numerals used to identify the leads on which those signals appear. As is well known to those skilled in the art of oscillator circuits, movement of the wiper 188 changes the amplitude of the triangular-wave signal 182. For example, assuming that the reference voltage $V_R$ is about one-half of the supply voltage $V+$, the signal 182 oscillates above and below $V_R$ by equal amounts. As the wiper 188 is moved downward in FIG. 5, closer to $V_R$, the amplitude of the signal 182 is reduced. The significance of this adjustment will also be discussed subsequently.

The comparator circuit 180 compares the DC signal 176 and the triangular-wave signal 182, and generates on its output lead 190 a square-wave signal which goes to a relatively higher voltage level (e.g., 0.6 v) while the signal 182 is greater than the signal 176, and goes to a relatively lower voltage level (e.g., 0.1 v) while the signal 182 is less than the signal 176. Because the triangular-wave signal 182 has a known, constant frequency, the resulting square-wave signal 190 has the same constant frequency, and has a duty cycle (i.e., ratio of time at high voltage to total cycle time) which is representative of the percentage of time that the signal 182 is greater than the signal 176. The duty cycle of the square-wave signal 190 is also representative of the change required in the displacement of the swashplate 26 in order to reduce the loading of the engine, and prevent the engine speed from dropping below the reference speed, such as the engine speed represented by the throttle setting 60.

The square-wave signal 190 is the input to a driver circuit, generally designated 192. The driver circuit 192 includes a transistor 194 connected to the output lead 50, while the other output lead 48 is connected to the supply voltage $V+$. As described in regard to FIGS. 1 and 4, the leads 48 and 50 are connected across the coil 126 of the valve 46. When the input signal 190 to the transistor 194 goes "HI", transistor 194 conducts, and there is a substantial voltage drop across the coil 126. When the input signal 190 goes "LO", transistor 194 becomes non-conductive, and there is no voltage drop across the coil 126. Therefore, when the signal 190 goes "HI", the valve 46 is "open" and when the signal 190 goes "LO", the valve 46 is "closed".

As was mentioned in connection with FIG. 4, the period of time during which the electro-magnetic valve 46 is open is relatively short. In the subject embodiment, the signal 182 generated by the oscillator circuit 184 has a frequency of 15 Hertz. As long as the actual engine speed is at least equal to the reference speed setting (whether such setting is manual or electrical), there is a substantially zero voltage drop across the coil 126, such that the valve 46 remains closed, and the auxiliary control valve 44 has no effect on the overall control system. However, if the actual engine speed drops below the reference speed, the control logic 52 begins to generate a square-wave signal across the coil 126, such that the valve 46 opens and closes at a frequency which is the same as the frequency of the triangular-wave signal 182. Thus, in the subject embodiment, the valve 46 opens and closes at 15 cycles per second. If the actual engine speed is just slightly below the reference speed, the signal 176 will be just a short distance below the "peak" of the signal 182, and the duty cycle of the signal 190 and of the voltage impressed across the coil 126 will be fairly small (e.g., 10%). In this condition, during each cycle of operation of the valve 46, the coil 126 is energized for only 10% of the cycle, and de-energized for 90% of the cycle, resulting in a relatively small drop in the fluid pressure within the stroker 28. If the actual engine speed would drop even further, relative to the reference speed, the DC signal 176 would decrease, thus increasing the duty cycle of the square-wave signal 190. The increase in the duty cycle of the signal 190 would increase the percent of the duty that the coil 126 is energized, further recuding the fluid pressure in the stroker 28.

Referring still to FIG. 5, the adjustable potentiometers 175 and 186 will now be described. If the actual engine speed and the reference speed are substantially equal, the voltage of the DC signal 176 will be substantially equal to the peak voltage of the signal 182. With the setting of the potentiometer 186 assumed constant, if the wiper of the potentiometer 175 is moved upward in FIG. 5, the signal 176 increases to a voltage above the peak voltage of the signal 182. In this condition, the actual engine speed could drop somewhat without causing the signal 176 to drop below the peak of signal 182 and generate a signal 190 having a duty cycle greater than 0%. Thus, moving the wiper of the potentiometer upward (closer to the voltage of the signal 172) is effective to reduce the reference speed, below which actual engine speed will result in a destroke of the swashplate 26. It should be apparent that movement of the wiper downward in FIG. 5 will have the opposite result, i.e., will be effective to increase the reference speed.

As was indicated previously, movement of the wiper 188 changes the amplitude of the signal 182. The significance of the amplitude of the signal 182 should be apparent from the following: if the voltage of the signal 176 is equal to the peak voltage of the signal 182, the duty cycle of the signal 190 is 0%; if the voltage of the signal 176 is at the minimum voltage of the signal 182, the duty cycle of the signal 190 is 100%. Therefore, for a given setting of the potentiometer 175, the amplitude of the signal 182 effectively determines the "gain" of the system, i.e., the range of engine speeds over which the pump 10 will go from maximum commanded stroke to zero stroke. In practicing the present invention, it should be understood that it would be necessary to correlate the settings of the potentiometers 175 and 186, in order to obtain the desired operating characteristics.

It should be apparent that the control system of the present invention, by modulating stroker pressure, is effective to control system pressure, i.e., the fluid pressure in the high pressure conduit (14 or 16). It will also become apparent that the ability to indirectly control system pressure by means of an on-off, electromagnetic valve operating at a relatively high frequency, has uses other than as an anti-stall control. Referring again to FIG. 5, the voltage divider circuit 178, which is unrelated to the anti-stall control, may be included in the control logic 52 so that the auxiliary control valve 44 may be used as an "inching" valve, or as a "dump" valve. With the wiper of the circuit 178 in its normal (dashed) position, the input to the inverting terminal of the comparator circuit 180 is the full signal 176. However, if the wiper is moved upward in FIG. 5, closer to ground, the input to the inverting terminal is reduced, thus increasing the duty cycle of the signal 190, and reducing the fluid pressure in the stroker 28, in accordance with the previous desctiption. In using the auxiliary control valve 44 as an inching valve, the circuit 178 may be operated, such as by a foot pedal, to move the wiper intermittently between one position and another position. Such movement of the wiper will cause the duty cycle of the signal 190 to vary accordingly, making it possible to control system pressure, as relatively lower pressure levels, and maintain smooth inching control of the vehicle. Similarly, if the auxiliary control 44 is to be used as a dump valve, all that is required is to move the wiper to the extreme upward position, such that the input to the inverting terminal is at zero voltage, which will keep the duty cycle of the signal 190 at 100%, thereby keeping the stroker 28 in communication with tank, through the open valve 46. It may be seen that one important feature of the control system of the present invention is its flexibility, i.e., the ability to add electronic logic to the control logic 52 to perform various control functions, without modifying the auxiliary control valve 44 or electro-magnetic valve 46. It may also be seen that as additional logic functions are added, it is possible to select, electronically, the relative priorities of such logic function, again without modifying the valves 44 and 46.

The control system disclosed in FIGS. 1–5 may, alternatively, be used as a motor output speed control, with relatively minor modifications. Referring first to FIG. 1, in order to use the auxiliary control valve 44 to control motor output speed, it would be necessary to provide, on the output shaft 32, a toothed member (such as the member 54 in FIG. 1), and to position adjacent thereto a magnetic pick-up (such as the pick-up 56 in FIG. 1). This motor output speed pick-up would be connected to the control logic 52 in the same manner as the lead 58 in FIG. 1. The only other modification needed would be to set the potentiometer 175 in the signal conditioning circuit 173, to correspond to the desired output speed. Alternatively, it may be desirable to use the system as both an anti-stall and an output speed control, in which case there could be a pair of the potentiometers 175 in parallel, with a manual switch provided to select mode of operation, or with electronic logic to give priority to one mode over the other. Whenever the auxiliary control valve 44 is used to control motor output speed, the manual control lever 42 is positioned to permit maximum displacement of the swashplate 26, and the operation of the valve 44 is effective to reduce swashplate displacement to the extent necessary to maintain the desired motor output speed. It should be apparent that whereas the potentiometer 175 of the anti-stall logic would preferably be preset by the operator, but would be pre-set by the vehicle manufacturer, the potentiometer 175 of the motor speed control logic would preferably be manually adjustable by the operator, permitting him either to select one of several discrete speeds, or to select over a range of speeds.

As was described previously, in the embodiment of FIGS. 2 and 3, the auxiliary control valve 44 is unidirectional. However, in certain applications it may be desirable for the auxiliary control valve to be able to communicate control fluid from stroker 30 to stroker 28, as well as from stroker 28 to stroker 30. This would be especially true in applications where the control logic 52 is not limited to anti-stall logic. For example, if the control logic 52 includes the voltage divider circuit 178 to make the control valve 44 function as an inching control, bi-directional operation would be desirable. Referring now to FIG, 6, there is illustrated an alternative embodiment wherein elements which are the same as in the FIG. 3 embodiment bear the same reference numeral and new, or modified elements bear numerals in excess of 200.

The alternative embodiment of the auxiliary control valve, generally designated 202, includes a valve body 204, defining a pair of fluid passages 206 and 208. The fitting assembly 104 is inserted into an upper, internally-threaded portion of the passage 206, while the fitting assembly 106 is inserted into the upper, internally-threaded portion of passage 208. The valve body 204 defines a pair of axially-aligned, multi-stepped bores 210 and 212, which communicate with the fluid passages 206 and 208, respectively. The bores 210 and 212 are in fluid communication with each other, through a restricted fluid passage 214.

One of the electro-hydraulic valves 46 is threaded into each of the bores 210 and 212, such that each of the valves (46a and 46b) is able to communicate fluid from its respective stroker to the fluid passage 214 in substantially the same manner that the valve 46 communicates fluid to the orifice 108 in the FIG. 3 embodiment.

Each of the electro-hydraulic valves 46a and 46b has its leads 48 and 50 connected to the control logic 52 in the manner illustrated in FIG. 5, such that the coils 126 are electrically in parallel. When a square-wave voltage signal is generated by the logic 52 both of the valves 46a and 46b are energized at the same duty cycle. For example, if the stroker 28 is pressurized, while the stroker 30 is communicating with tank, and an input is given to the control logic 52 indicating a need for a destroke, the logic 52 begins to generate a square-wave voltage across the coils of the valves. As the valves are energized at the appropriate duty cycle, pressurized control fluid is communicated from the fluid passage 206, through the valve 46a, to the restricted passage 214 in the manner described in connection with FIG. 4. At the same time, control fluid in the passage 214 unseats the poppet 104 of the valve 46b and flows through the ports 114 into the passage 208. It should be appreciated that the flow through the valve 46b will be as just described, regardless of whether or not its coil is being energized in the same manner as the coil of the valve 46a. However, in order to simplify the control logic, it would normally be preferred to have both of the valves 46a and 46b electrically in parallel, such that both are energized together.

Figure 7:
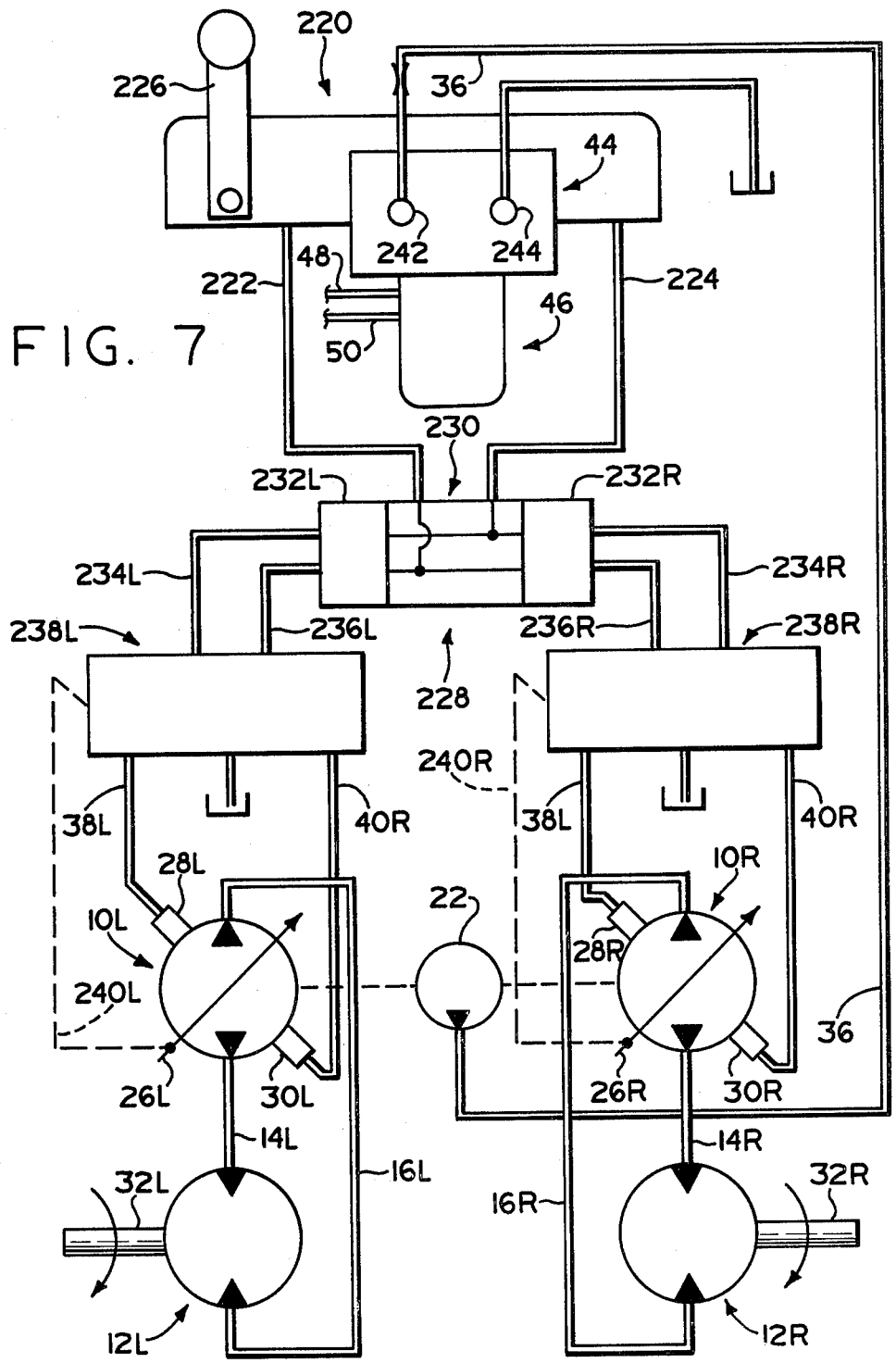
FIG. 7 is a view similar to FIG. 1 illustrating an alternative hydrostatic transmission control system, utilizing the present invention.

The embodiments of the present invention described thus far are suitable for controlling stroker pressure in a single hydrostatic transmission, i.e., one pump and one motor. However, in many hydrostatic transmission applications, especially dual track vehicles, it is necessary to be able to synchronize the operation of a pair of hydrostatic transmission control systems. FIG. 7 illustrates such a system, utilizing the auxiliary control valve 44 of the present invention. In the system shown in FIG. 7, elements which are the same in the FIG. 1 embodiment bear the same reference numeral, followed by either an L or an R to indicate the left or right hydrostatic transmission, respectively. To aid in understanding the system of FIG. 7, and several of the elements container therein, reference should be made to U.S. Pat. No. 3,795,109, assigned to the assignee of the present invention, and incorporated herein by reference.

The output of the charge pump 22 is communicated by means of the conduit 36 to a hydraulic command station 220 (speed control valve 42 of U.S. Pat. No. 3,795,109). The hydraulic command station 220 receives pressurized control fluid at its inlet port, and communicates pressurized control fluid to either of a pair of conduits 222 or 224, depending upon the direction of movement of a manual control handle 22. The pressure of the control fluid in the conduit 226 or 224 is proportional to the displacement of the handle 226. The conduits 222 and 224 are connected to a flow divider control assembly, generally designated 228, including a control flow divider portion 230 and a pair of steering control portions 232L and 232R (steering control valves 46 and 48 of U.S. Pat. No. 3,795,109). The function of the flow divider portion 230 is to receive pressurized control fluid from either of the conduits 222 or 224 and divide it into two equal flow paths, as is well known in the art. The function of the steering control portions 232L and 232R is to permit relatively unrestricted flow of pressurized control fluid when stright tracking is desired, but to modify the pressure and/or flow of the control fluid, being communicated to one of the hydrostatic transmissions to permit steering of the vehicle, as is also well known in the art. Control fluid is communicated from the flow divider control assembly 228, by means of conduits 234L and 236L to a hydraulic remote receiver 238L, and by means of conduits 234R and 236R to a hydraulic remote receiver 238R. The hydraulic receivers 238L and 238R (control motor 126 and pilot valve 128 of U.S. Pat. No. 3,795,109) have mechanical feedback linkages 240L and 240R to the swashplates 26L and 26R of the variable pumps 10L and 10R, respectively.

Although it would be possible to utilize one of the auxiliary control valves 44 in association with each of the hydraulic receivers 238L and 238R, it will be appreciated that the added expense, and possible difficulty in synchronizing a pair of the valves 44 prevents such an arrangement from being preferred. Instead, in the FIG. 7 system, the auxiliary control valve 44 may have an internal construction identical to that shown in FIGS. 2 and 3, but with the fitting assembly 104 threaded into the inlet port of the command station 220, and the fitting assembly 106 threaded into the tank part of the command station. In addition, the fluid conduit 36 communicates with the fluid passage 98 by means of a fitting 242, while the fluid passage 102 is communicated to tank through a fitting 244. The electro-hydraulic valve 46 has its leads 48 and 50 connected to the control logic 52 in the same manner as in the FIG. 1 embodiment, and in an impending stall condition, the operation of the valves 44 and 46, as well as the duty cycle of the square-wave voltage impressed across the coil 126, will be the same as in the FIG. 1 system.

It should be apparent to those skilled in the art that the FIG. 7 embodiment could be utilized to perform control functions other than anti-stall, in the same manner, and by means of the same modifications, as the FIG. 1 embodiment.

What is claimed is:

1. In a control system for a hydrostatic transmission of the type including a prime mover driven variable displacement pump; a fluid motor; fluid operable means for varying the displacement of the pump, the fluid operable means defining first and second fluid pressure chambers for varying the displacement of the pump in first and second opposite directions; a source of pressurized control fluid for operating the fluid operable means; supply conduit means in fluid communication with the source of control fluid, main control means operable to control the flow of control fluid from the supply conduit means to one of the first and second fluid pressure chambers through one of first and second fluid conduit means, respectively, and to control the flow of control fluid from the other of the first and second fluid chambers to a reservoir; the improvement comprising:
(a) auxiliary anti-stall override control valve means defining control conduit means operable to communicate control fluid from said one of the first and second fluid conduit means to said other of the first and second fluid conduit means;
(b) said auxiliary control valve means including an on-off, electro-hydraulic valve disposed in said control conduit means to prevent fluid communication therethrough in response to an electrical input signal in one condition, and to permit fluid communication therethrough in response to an electrical input signal in another condition;
(c) control logic means operable in response to variations in an input condition to alternate said electrical input signal between said one condition and said another condition at a duty cycle determined by the deviation of said input condition from a normal operating condition, said input condition comprises the speed of operation of the prime mover, and said normal operating condition comprises a prime mover reference setting speed.

2. The improvement as claimed in claim 1 wherein the duty cycle of said electrical input signal is zero percent when said input condition is substantially equal to said normal operating condition, the electrical input signal remaining in said one condition when the duty cycle is zero percent.

3. The improvement as claimed in claim 1 wherein the main control means includes a valve housing defining a spool bore and first and second passages extending from said spool bore to the exterior of said valve housing, the first and second fluid conduit means including said first and second passages, respectively.

4. The improvement as claimed in claim 3 wherein said auxiliary control valve means includes a valve body defining said control conduit means, and further includes one fitting means communicating between said control conduit means, upstream of said electro-hydraulic valve, and one of said first and second passages, and another fitting means communicating between said control conduit means, downstream of said electro-hydraulic valve, and the other of said first and second passages.

5. The improvement as claimed in claim 1 wherein said electro-hydraulic valve includes check valve means to prevent fluid communication from said other of the first and second fluid conduit means to said one of the first and second fluid conduit means.

6. The improvement as claimed in claim 1 wherein said control conduit means is operable to communicate control fluid from said other of the first and second conduit means to said one of the first and second fluid conduit means.

7. The improvement as claimed in claim 6 including another on-off electro-hydraulic valve disposed in said control conduit means to prevent fluid communication from said other to said one of the first and second fluid conduit means in response to an electrical input signal in said one condition, and to permit fluid communication from said other to said one of the first and second fluid conduit means in response to an electrical input signal in said other condition.

8. In a control system for a hydrostatic transmission of the type including a prime mover driven variable displacement pump; a fluid motor; fluid operable means for varying the displacement of the pump, the fluid operable means defining first and second fluid pressure chambers for varying the displacement of the pump in first and second opposite directions; a source of pressurized control fluid for operating the fluid operable means; main control means operable to control the flow of pressurized control fluid from the source to the fluid operable means; the source of control fluid, the main control means and the first fluid pressure chamber defining a first control fluid path; and the second fluid pressure chamber, the main control means, and a fluid reservoir defining a second control fluid path; the improvement comprising:
(a) auxiliary anti-stall override control valve means defining control conduit means operable to communicate control fluid from said first control fluid path to said second control fluid path;
(b) said auxiliary control valve means including an on-off, electro-hydraulic valve disposed in said control conduit means to prevent fluid communication therethrough in response to an electrical input signal in one condition, and to permit fluid communication therethrough in response to an electrical input signal in another condition; and
(c) control logic means operable in response to variations in an input condition to alternate said electrical input signal between said one condition and said another condition at a duty cycle determined by the deviation of said input condition from a normal operating condition, said input condition comprises the speed of operation of the prime mover, and said normal operating condition comprises a prime mover reference setting speed.

9. The improvement as claimed in claim 8 wherein the duty cycle of said electrical input signal is zero percent when said input condition is substantially equal to said normal operating condition, the electrical input signal remaining in said one condition when the duty cycle is zero percent.

* * * * *